US009450429B2

(12) United States Patent
Yeiser, IV (10) Patent No.: US 9,450,429 B2
(45) Date of Patent: Sep. 20, 2016

(54) WOMAN'S ACCESSORY SMARTPHONE BATTERY CHARGER

(71) Applicant: John O. Yeiser, IV, El Cajon, CA (US)

(72) Inventor: John O. Yeiser, IV, El Cajon, CA (US)

( * ) Notice: Subject to any disclaimer, the term of this patent is extended or adjusted under 35 U.S.C. 154(b) by 0 days.

(21) Appl. No.: 14/039,822

(22) Filed: Sep. 27, 2013

(65) Prior Publication Data
US 2015/0094123 A1 Apr. 2, 2015

(51) Int. Cl.
*H04B 1/38* (2015.01)
*H04M 1/00* (2006.01)
*H02J 7/00* (2006.01)
*H04B 1/3888* (2015.01)
*H04M 1/04* (2006.01)
*H04M 1/21* (2006.01)

(52) U.S. Cl.
CPC .......... *H02J 7/0042* (2013.01); *H04B 1/3888* (2013.01); *H02J 7/0047* (2013.01); *H02J 7/0052* (2013.01); *H02J 2007/0062* (2013.01); *H04M 1/04* (2013.01); *H04M 1/21* (2013.01)

(58) Field of Classification Search
USPC .......... 455/556.1, 573, 575.1, 90.3; 132/293, 132/301
See application file for complete search history.

(56) References Cited

U.S. PATENT DOCUMENTS

| 6,311,077 | B1 * | 10/2001 | Bien | 455/566 |
|---|---|---|---|---|
| 2007/0278995 | A1 * | 12/2007 | Batdorff et al. | 320/107 |
| 2009/0021214 | A1 * | 1/2009 | Foster | H01M 10/465 320/114 |
| 2012/0043937 | A1 * | 2/2012 | Williams | H02J 7/0044 320/115 |
| 2012/0279516 | A1 * | 11/2012 | Bouix et al. | 132/301 |
| 2013/0214931 | A1 * | 8/2013 | Chia | H02J 7/0042 340/815.4 |
| 2014/0228082 | A1 * | 8/2014 | Morrow et al. | 455/575.8 |
| 2014/0274204 | A1 * | 9/2014 | Williams | H02J 7/0013 455/556.1 |
| 2014/0302896 | A1 * | 10/2014 | Xu | H04B 1/3883 455/574 |

* cited by examiner

*Primary Examiner* — Blane Jackson
(74) *Attorney, Agent, or Firm* — Eleanor Musick; Musick Davison LLP (57) ABSTRACT

A compact mirror for use with woman's cosmetics includes a smartphone battery charging system integrated therein. A connection interface, such as, for example, a USB interface, is in electrical communication with an internal rechargeable battery pack. Upon connection of a smartphone via the connection interface, the user can charge their smartphone device. When the internal rechargeable battery is exhausted, an external charger is connected to the connection interface to recharge the same. One or more indicators provide visual indication of the charging status of the internal battery and/or the connected smartphone.

11 Claims, 8 Drawing Sheets

WOMAN'S ACCESSORY SMARTPHONE BATTERY CHARGER

BACKGROUND

1. Technical Field

The present principles relate to woman's accessories. More particularly, it relates a smartphone charging system integrated into a woman's compact mirror, wallet or pocketbook organizer.

2. Related Art

The use of compact mirrors is very common, and most women will carry one when they go out for the night. It doesn't matter what the occasion, women will carry a compact mirror to provide them with the ability to check and/or fix their makeup. Most women also now carry a smartphone of some kind when they are out and about.

It is very common to find oneself out and about only to find that the battery on their smartphone device has become depleted to the point where the same is no longer usable. More often than not, the smartphone user does not carry the charger for the same with them, and as such, they are now left with a non-functioning smartphone. Sometimes this can happen late at night when the user needs to make a call to get a ride or let someone know where they are. As such, there is always a need for the smartphone user to have the ability to charge their phone at least enough to use the same.

SUMMARY

According to an implementation, the present principles provide a compact mirror having a smartphone battery charging system integrated into the same.

This and other aspects are achieved in accordance with an implementation of the present principles where the compact mirror includes a base, a hinged cover connected to the base, and a battery charging circuit contained within the base and including an external connection interface. In alternative embodiments, the base can include at least one related item releasably stored therein (e.g., tweezers).

According to another implementation, the compact mirror includes a base having at least one cosmetic related item releasably stored therein, a hinged cover connected to the base, and a battery charging circuit contained within the base and including an internal connection interface.

According to yet another implementation, the compact mirror includes a base having at least one cosmetic related item releasably stored therein, a hinged cover connected to the base, and a battery charging circuit contained within the base and including a connection interface. The battery charging circuit includes a rechargeable battery in electrical communication with the connection interface; and at least one indicator for providing a visual indication of a charging status of the rechargeable battery. The connection interface can be at least one of a USB, mini-USB, micro-USB or a manufacturer proprietary connector.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to woman's accessories that include a smartphone charging system integrated therein. As shown in the various examples, this charging system is implemented into a compact mirror, a wallet and/or a pocket book or pocket book organizer.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

Figure 1:
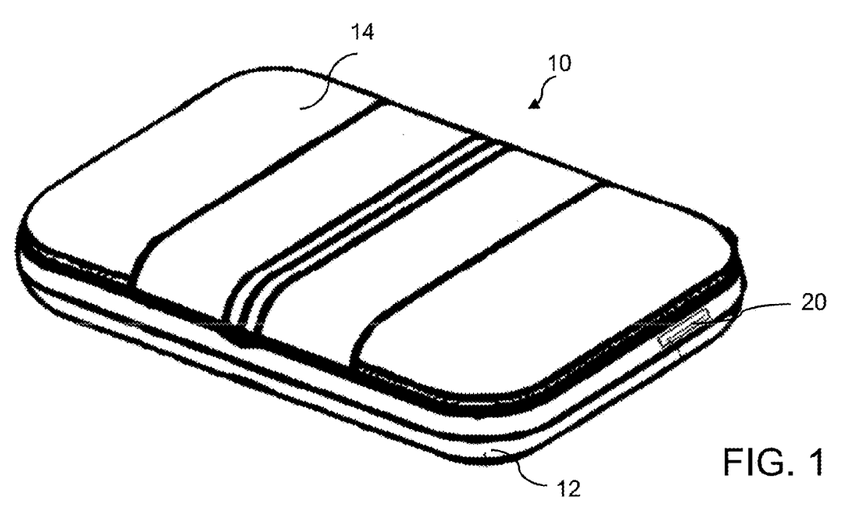
FIG. 1 is perspective view of a compact mirror according to an implementation of the present principles.
Figure 2:
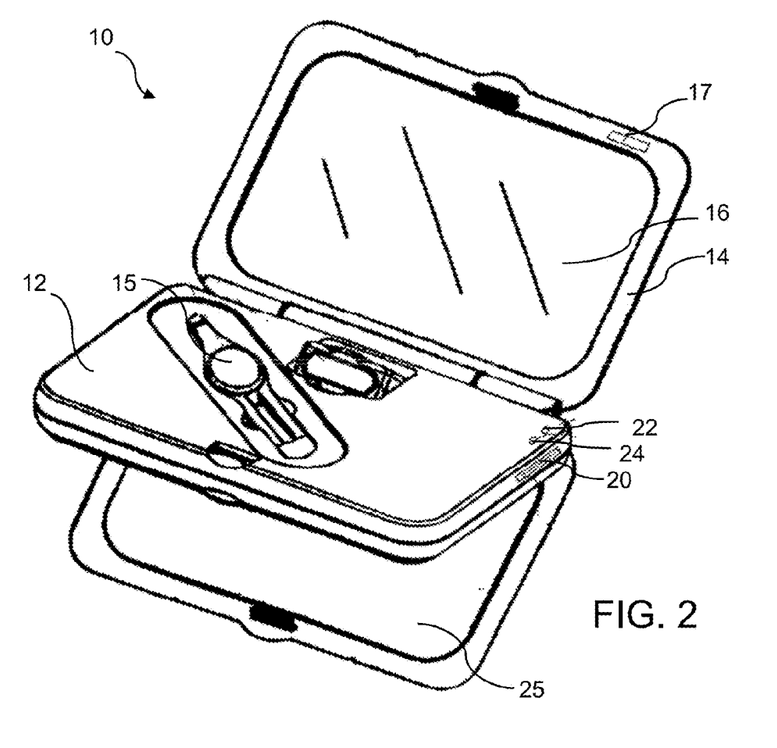
FIG. 2 is a perspective view of the compact mirror open according to an implementation of the present principles.

Referring to FIGS. 1 and 2, there is shown a compact 10 having a base 12, and a hinged cover 14. The base 12 may include one or more items 15 for use by a woman, generally of a cosmetic nature. A mirror 16 is positioned in the hinged cover 14 and includes a light 17 positioned therein which is activated by a hinge or door switch (not shown). The one or more items 15 can include various cosmetics (e.g., blush, base, eye makeup, etc.) and may also include a brush or cosmetic applicator for use with the included cosmetic. In another implementation, a second mirror 25 can be added to the compact 10.

In accordance with a preferred implementation, the compact 10 includes a USB connection interface 20 which, in this example, is contained on the side of the base 12.

Figure 3:
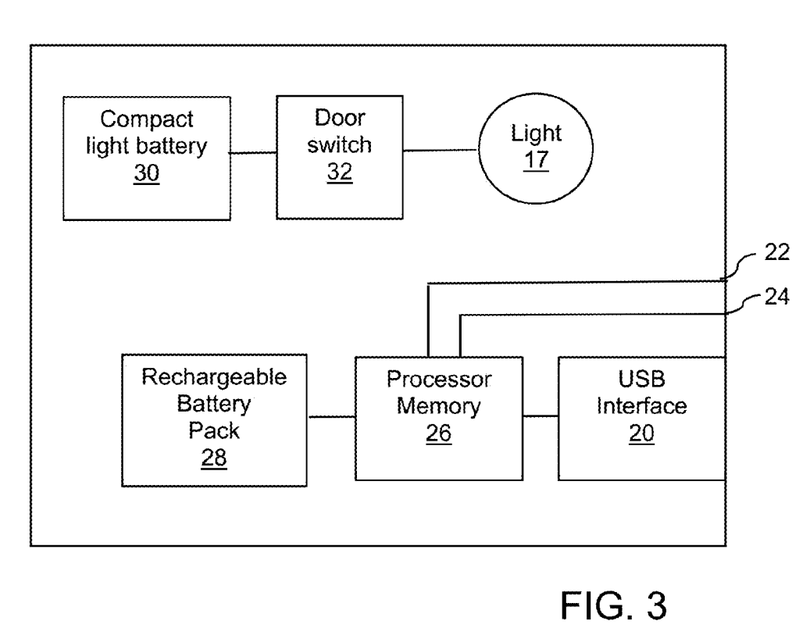
FIG. 3 is a block diagram of the smartphone battery changing system according to an implementation of the present principles.

Referring to FIG. 3, there is shown a block diagram of and implementation of the circuitry contained within the compact 10. The compact 10 generally includes a light 17 which is activated by a door/hinge switch 32, and which is powered by a light battery 30. Generally, this battery 30 can be replaced via a compartment on the bottom of the base 12.

In this implementation, the compact 10 further includes a smartphone charging system made up of a rechargeable battery pack 28 connected to the USB interface 20 via a processor/memory 26. The processor/memory 26 shall execute any smartphone or internal battery charging protocols/algorithms depending on the particular design, including the sensing of a connected device (either smartphone or internal battery charging device). In other contemplated implementations the battery pack 28 could be a "smart" battery having its own limited processor capability for indicating charging levels, etc., thus eliminating the need for any processing capability.

In order to use the battery charging system, a user simply connects their smartphone to the USB interface and their smartphone is charged using the battery pack 28. The life of the battery pack 28 can be variable depending on the types of batteries used and/or the amount of charging required to the connected smartphone. Battery pack 28 can be any suitable type of rechargeable battery. Some examples of rechargeable batteries include lead-acid, nickel cadmium (NiCd), nickel metal hydride NiMH, Lithium-ion (Li-ion), and Lithium-ion polymer (Li-ion polymer). Depending on the desired implementation, the battery pack 28 can be completely enclosed within the compact 10, or alternatively, can be replaceable via an access compartment In accordance with another implementation, the compact 10 will include one or more indicators 22, 24 for providing visual indications to the user. These indicators can be used for various things, including, for example indicating a connection at USB interface 20, indicating a charging status of the connected smartphone, indicating the battery level, etc. In addition to visual indicators, audio indicators may also be provided for audibly indicating any one or more of the above, for example, when the battery 28 has been discharged to a point requiring recharge. Visual and/or audio indicators of this nature will be controlled by the processor and thereby will not provide any low battery level indications while the compact is charging a connected smartphone. As such, these indicators will preferably provide their respective indications when no smartphone is connected to the compact.

The battery pack 28 would be sufficient to charge a connected smartphone at least once fully, and possibly more. Once the battery pack 28 is exhausted, the user then connects a charger (not shown) to the USB interface to charge the same. One of the indicators 22 can be used for providing the user with a visual indication of the charging status of the battery pack 28.

In one implementation, the LED indicator lights will be configured to provide a battery charge level indication. For example, a user could depress a button on the mirror that will illuminate a series of LEDs which would visually indicate the battery charge level/status.

In another implementation, the LED visual indicators and/or the audible indicator would be configured so as to light or sound once a minute (or other predetermined time interval) when the battery level has dropped below a predetermined threshold and requires charging.

In yet another implementation, these indicators would operate to provide both the charge level indication and the low battery level indication.

Those of skill in the art will appreciate that the USB interface 20 can be any acceptable connection interface, including, but not limited to mini-USB, or a manufacturer proprietary connector, such as, for example the APPLE® iphone/ipod proprietary connectors, etc. without departing from the intended scope of the present invention.

Figure 4:
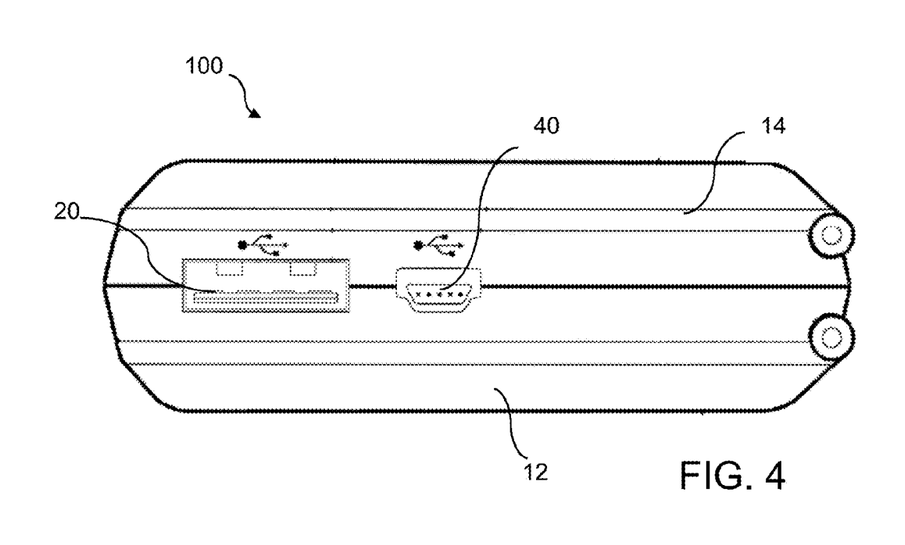
FIG. 4 is a side view of a compact mirror according to another implementation of the present principles.
Figure 5:
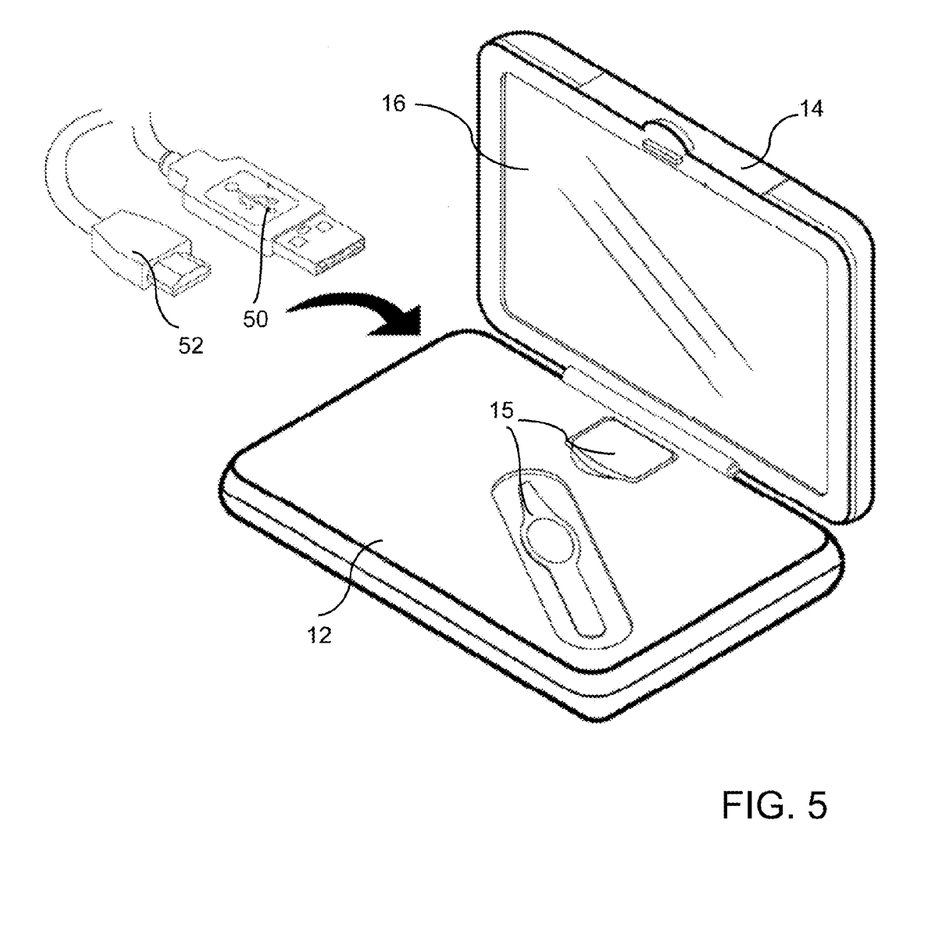
FIG. 5 is a perspective view of the compact mirror open according to another implementation of the present principles.

FIG. 4 shows another implementation where in addition to a standard USB connection 20, a mini-USB or micro-USB connection 40 is also provided to the compact mirror 100. FIG. 5 shows a stander USB plug 50 and a mini-USB plug 52 configured to be received by the connection ports 20 and 40, respectively.

Figure 6:
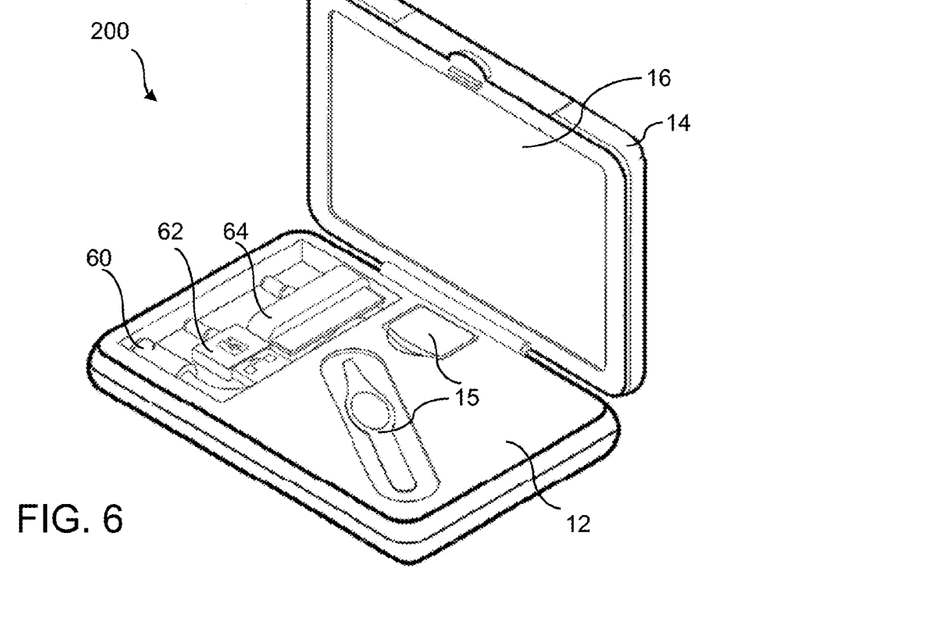
FIG. 6 is a perspective view of the compact mirror open according to yet another implementation of the present principles.
Figure 7:
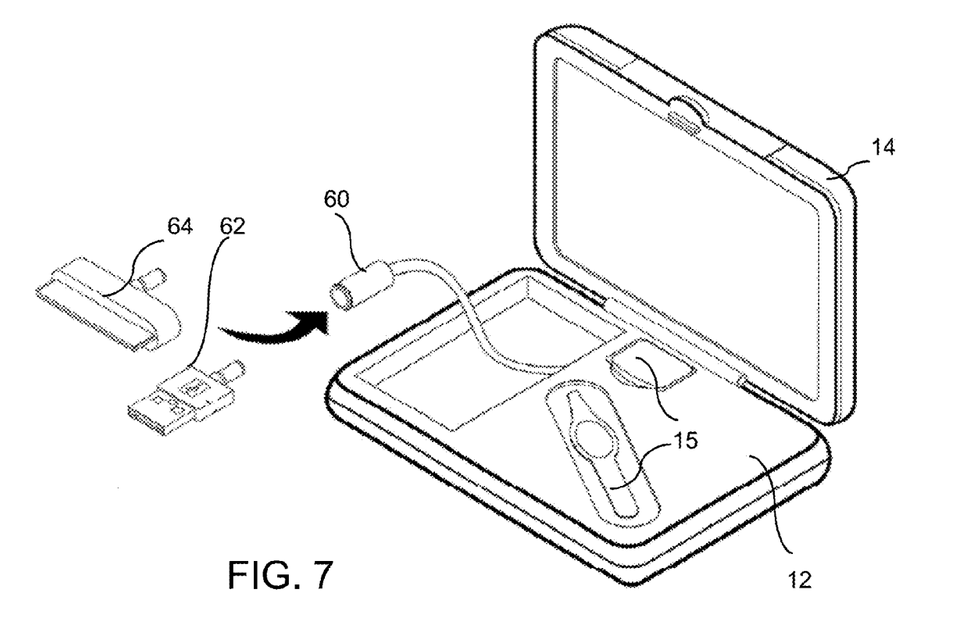
FIG. 7 is a perspective view of the compact mirror shown in FIG. 6, according to an implementation of the present principles.
Figure 8:
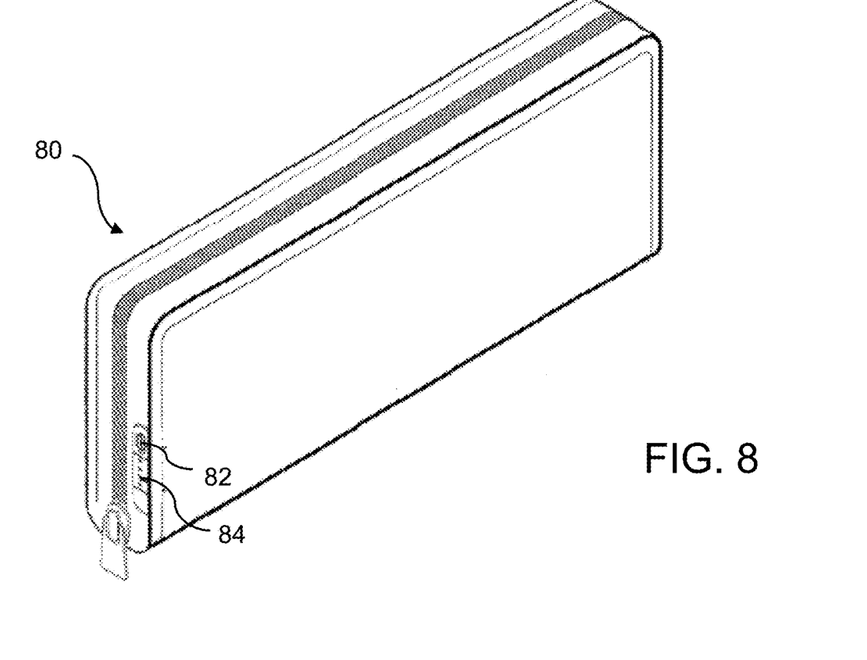
FIG. 8 is a perspective view of a wallet according to an implementation of the present principles.
Figure 9:
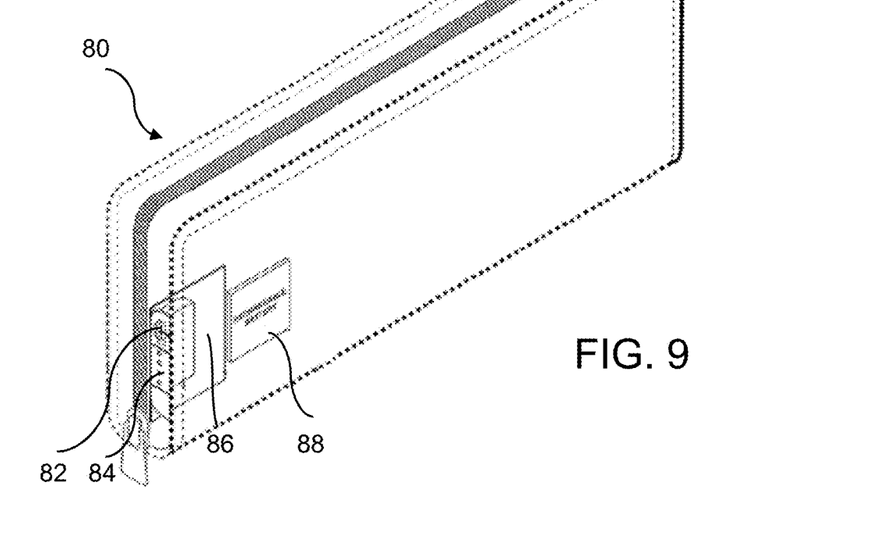
FIG. 9 is perspective view, in partial phantom, of the wallet according to an implementation of the invention.
Figure 10:
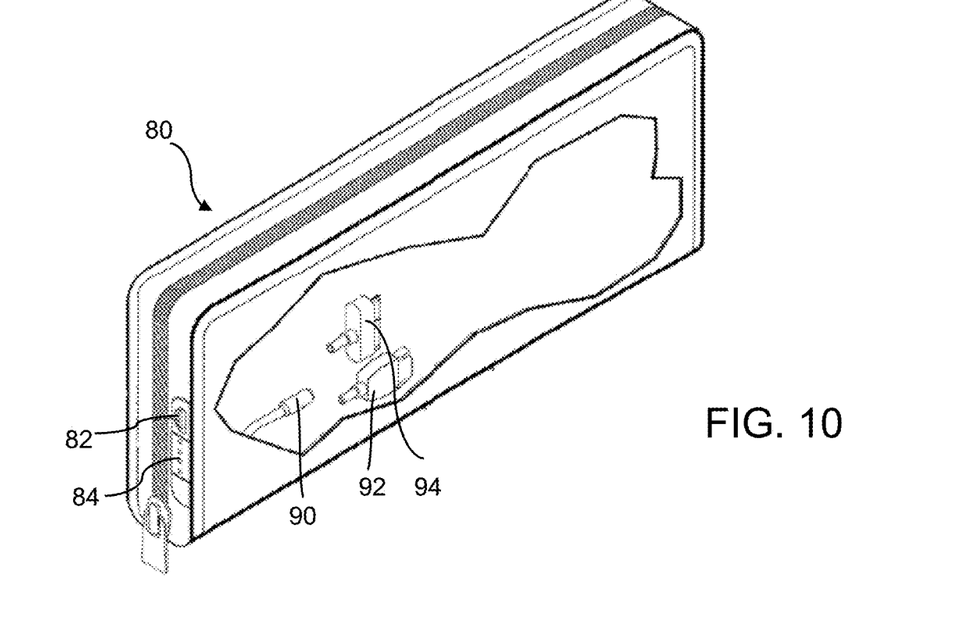
FIG. 10 is perspective view, partially broken away, of the wallet according to an implementation of the invention.
Figure 11A:
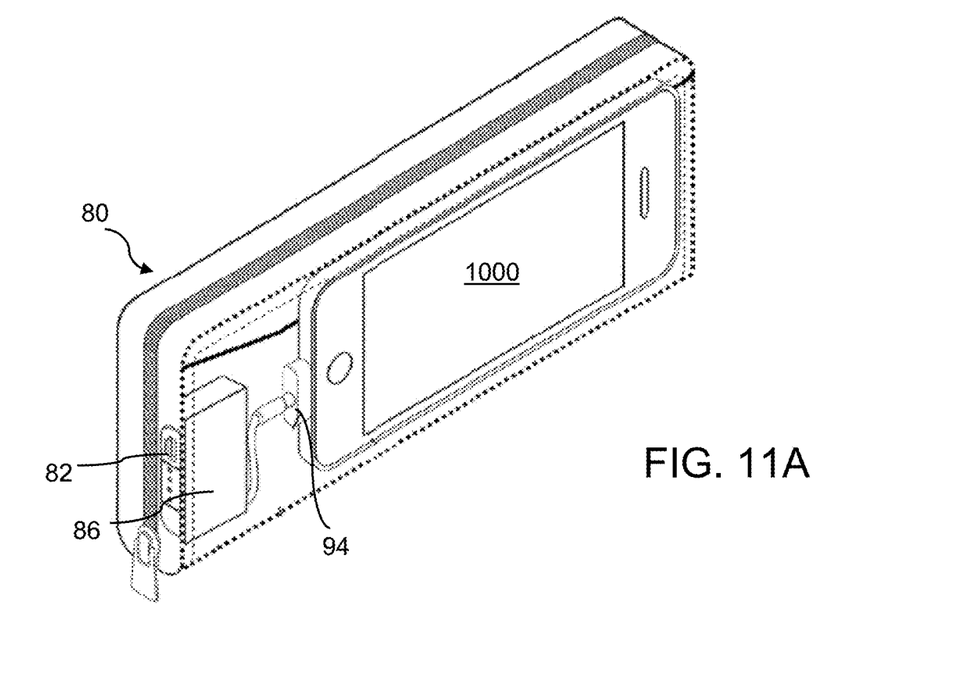
FIG. 11a is a perspective view, in partial phantom, of the wallet according to an implementation of the invention.
Figure 11B:
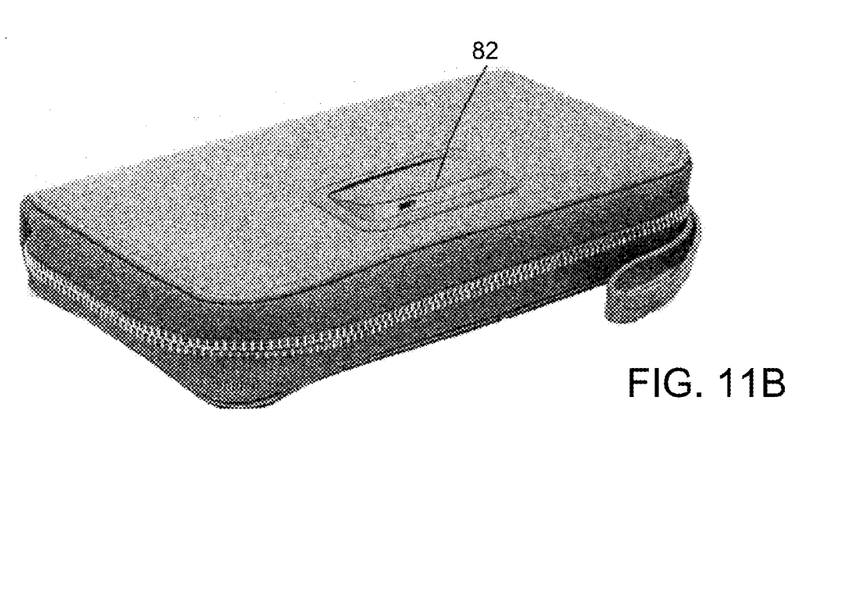
FIG. 11b is a perspective view of the wallet according to another implementation of the invention.

FIG. 6 shows another implementation of the compact mirror 200 where there are no external plugs on the same. Here, an internal plug 60 is provided, and one or more connectors 62, 64 are provided. As shown in FIG. 7, the connector 62 is a standard USB connector, while the connector 64 is an APPLE® iphone/ipod proprietary connector. As shown, the user can select the appropriate connector 62 or 64 and attached the same to the internal plug 60. Those of skill in the art will appreciate that different connector configurations (e.g., mini-USB, micro-USB, etc.) can be provided without departing from the intended scope of the invention.

FIGS. 8-11 show an alternative implementation of the smartphone charging system as implemented in a wallet 80. As shown, USB connections 82 and/or 84 are provided on the side of the wallet, and which are connected to a printed circuit board (PCB) 86. The PCB 86 includes similar processing/memory and USB interfaces as shown in FIG. 3 described above. The rechargeable battery 88 is in electrical communication with the PCB 86. As with the previously compact mirror embodiment, an internal plug 90 can be provided and one or more different USB or smartphone specific connectors 92, 94 can be provided. FIG. 11a shows a phone 1000 attached to the connectors 94 as would be arranged within the wallet 80. In other contemplated implementations, the charger 82 would be configured as a flip up control panel allowing access to the charging functions when needed. When not in use, the panel would be closed (See FIG. 11b).

Figure 12:
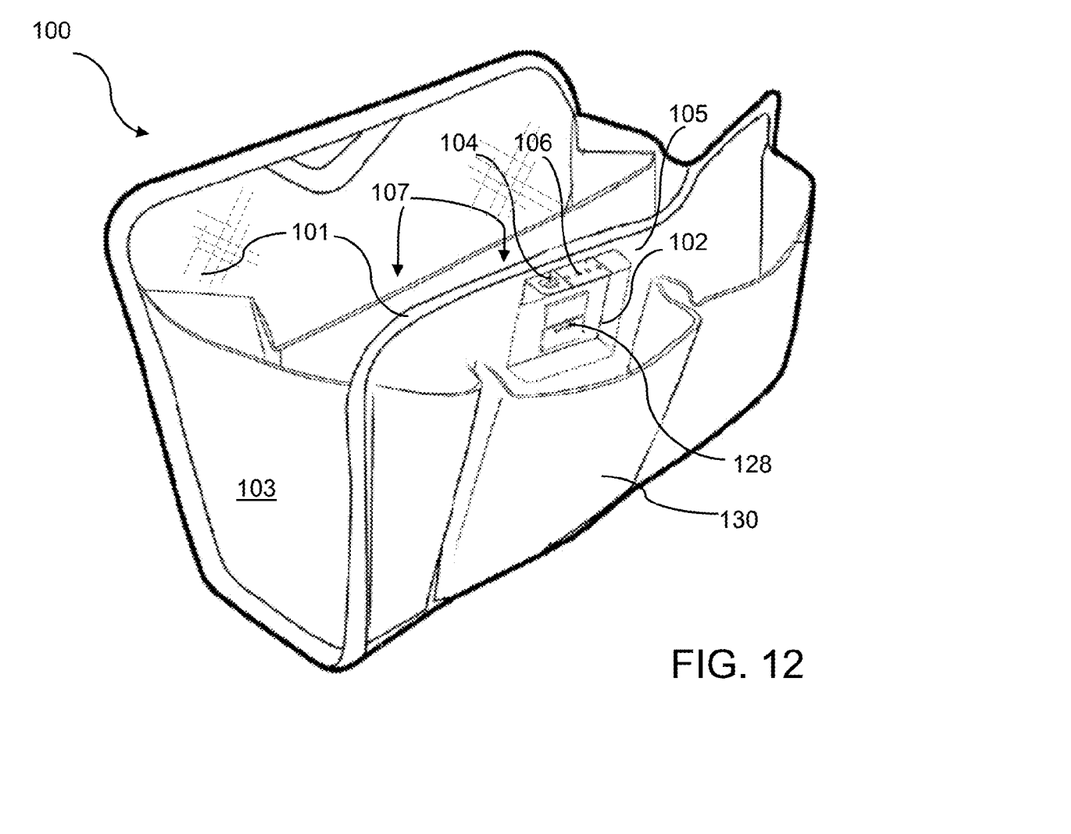
FIG. 12 is a perspective view of a pocket book organized, according to an implementation of the invention.
Figure 13:
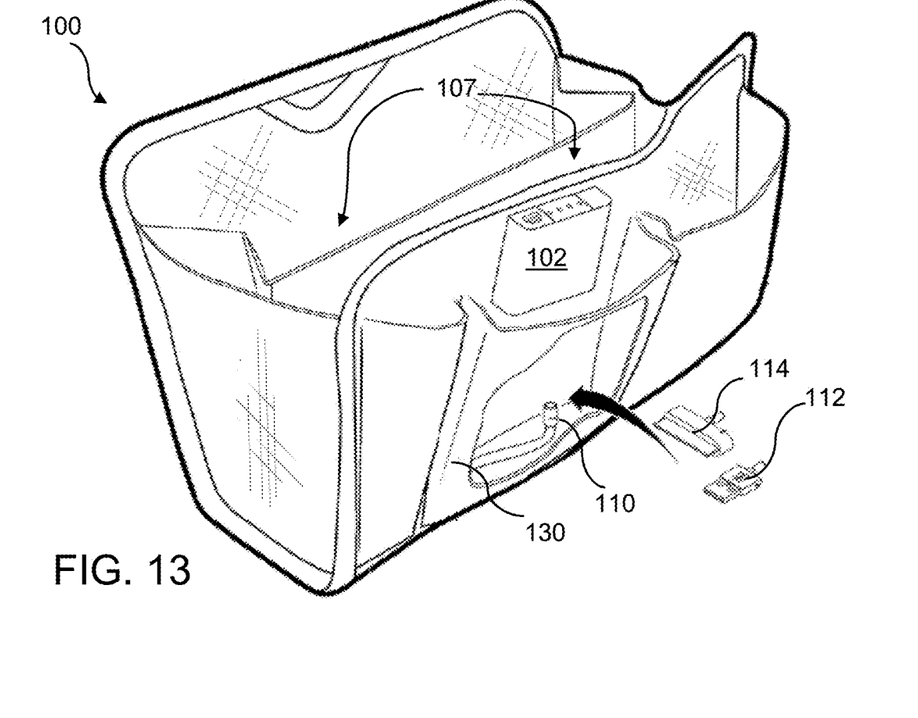
FIG. 13 is a perspective view, partially broken away, of the pocket book organized, according to an implementation of the present principles.
Figure 14:
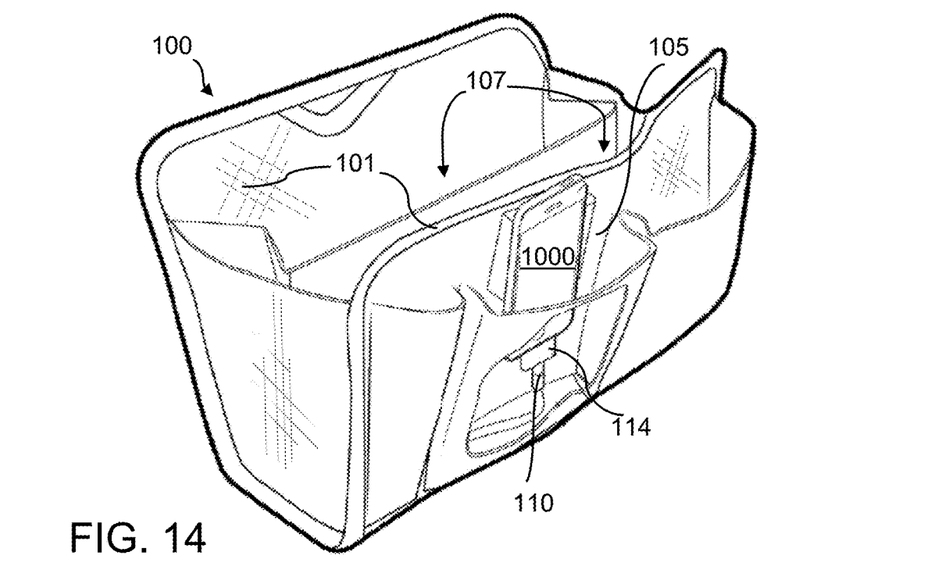
FIG. 14 is a perspective view, partially broken away, of the pocket book organized, according to an implementation of the present principles.

FIGS. 12-14 show another alternative implementation of a smartphone charging system 102 as implemented in a pocket book organizer 100 having at least two compartment sides 101 joined at ends 103 to form an openable pocket 107 for receiving and retaining personal items. As shown, the USB connections 104 and 106 are provided on the upper end of the charging system 102 located in separate power pack compartment 105. The rechargeable battery 128 is contained within the charging system 102. An internal connector 110 is positioned within a pocket 130 and is configured to be connected to one or more different connectors 112, 114. FIG. 14 shows an example of the smartphone 1000 located within the power pack compartment 105 connected to the charging system via plug 110 and connector 114.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A pocketbook organizer, comprising:
   at least one compartment defined by at least two compartment sides joined at ends to form at least one openable pocket configured for receiving and retaining a plurality of personal items of a user;
   A pocket separate from the at least one openable pocket, the pocket configured for retaining a portable electronic device;
   a power pack compartment separate from the at least one openable pocket and having a common side with one of the at least two compartment sides, the power pack compartment being electrically accessible from at least one of the at least one openable pocket and the pocket;
   a rechargeable power pack at least partially enclosed within the power pack compartment; and
   at least one interface in electrical communication with the rechargeable power pack, the at least one interface configured to be connected to the portable electronic device disposed within one of the at least one compartment and the pocket of the pocketbook organizer to charge the same.

2. The pocketbook organizer according to claim 1, wherein said at least one interface comprises at least one of a USB, mini-USB, micro-USB, and a manufacturer-proprietary connector.

3. The pocketbook organizer according to claim 1, wherein said rechargeable power pack further comprises a battery charging circuit, said battery charging circuit comprising:
   a rechargeable battery in electrical communication with the at least one interface; and
   at least one indicator for providing a perceivable indication of a charging status of the rechargeable battery.

4. The pocketbook organizer according to claim 3, wherein the at least one indicator comprises a visual indicator.

5. The pocketbook organizer according to claim 3, wherein the at least one indicator comprises an audio indicator.

6. The pocketbook organizer according to claim 3, wherein the at least one indicator comprises a visual indicator for providing a visual indication that the charge in the rechargeable battery has dropped below a predetermined threshold.

7. The pocketbook organizer according to claim 3, wherein the at least one indicator comprises an audio indicator for providing an audible indication that the charge in the rechargeable battery has dropped below a predetermined threshold.

8. The pocketbook organizer according to claim 3, wherein the visual indicator comprises one or more LEDs disposed adjacent the at least one interface.

9. The pocketbook organizer according to claim 3, further comprising a user-actuatable button for activating the at least one indicator.

10. The pocketbook organizer according to claim 1, wherein at least one of the plurality of personal items comprises a portable electronic device, and the at least one openable pocket is dimensioned to retain the portable electronic device during charging.

11. The pocketbook organizer according to claim 1, further comprising an openable panel configured for covering the rechargeable power pack when not in use.

\* \* \* \* \*